US009699794B2

(12) United States Patent
Lee et al.

(10) Patent No.: US 9,699,794 B2
(45) Date of Patent: Jul. 4, 2017

(54) METHOD AND APPARATUS FOR PERFORMING SCHEDULING IN WIRELESS COMMUNICATION SYSTEM

(71) Applicant: Samsung Electronics Co., Ltd., Suwon-si, Gyeonggi-do (KR)

(72) Inventors: Hee-Kwang Lee, Suwon-si (KR); Ho-Joong Kwon, Ansan-si (KR); June Moon, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 14/089,002

(22) Filed: Nov. 25, 2013

(65) Prior Publication Data

US 2014/0148181 A1 May 29, 2014

(30) Foreign Application Priority Data

Nov. 23, 2012 (KR) ........................ 10-2012-0134077

(51) Int. Cl.
*H04W 72/00* (2009.01)
*H04W 72/08* (2009.01)
(Continued)

(52) U.S. Cl.
CPC ......... *H04W 72/085* (2013.01); *H04L 1/0031* (2013.01); *H04L 5/006* (2013.01);
(Continued)

(58) Field of Classification Search
None
See application file for complete search history.

(56) References Cited

U.S. PATENT DOCUMENTS

2005/0068979 A1\* 3/2005 Boer .................. H04L 27/0012
370/445
2010/0142471 A1 6/2010 Cheng et al.
(Continued)

FOREIGN PATENT DOCUMENTS

| EP | 2467957 A2 | 6/2012 |
| WO | 2011/022733 A2 | 2/2011 |
| WO | 2012/028180 A1 | 3/2012 |

OTHER PUBLICATIONS

LG Electronics, 'CoMP Performance Evaluation under Low-capacity/High-latency Backhaul', R1-112339, 3GPP TSG RAN WG1 Meeting #66, Athens, Greece, Aug. 22-26, 2011.
(Continued)

*Primary Examiner* — Suhail Khan
(74) *Attorney, Agent, or Firm* — Jefferson IP Law, LLP

(57) ABSTRACT

Performing scheduling operations by a centralized scheduler in a wireless communication system. Receiving Channel State Information (CSI) about a channel between each of a plurality of Transmission Points (TPs) and each of a plurality of User Equipments (UEs) performing communication with each of the plurality of TPs from each of the plurality of TPs, performing a first scheduling operation for allocating wireless resources to each of the plurality of TPs based on the CSI received from each of the plurality of TPs, and transmitting first scheduling information representing a result of the first scheduling operation to each of the plurality of TPs. The first scheduling information contains transmission power information representing transmission power for each of the wireless resources allocated to each of the plurality of TPs, and is used to perform a second scheduling operation to select a UE to communicate with each of the plurality of TPs.

20 Claims, 10 Drawing Sheets

(51) Int. Cl.
*H04W 52/24* (2009.01)
*H04L 5/00* (2006.01)
*H04W 72/12* (2009.01)
*H04W 28/16* (2009.01)
*H04W 52/14* (2009.01)
*H04L 1/00* (2006.01)

(52) U.S. Cl.
CPC ....... *H04W 52/241* (2013.01); *H04W 52/243* (2013.01); *H04W 52/245* (2013.01); *H04W 72/1231* (2013.01); *H04L 1/0026* (2013.01); *H04W 28/16* (2013.01); *H04W 52/143* (2013.01)

(56) References Cited

U.S. PATENT DOCUMENTS

| | | | |
|---|---|---|---|
| 2010/0261482 A1 | 10/2010 | Guey | |
| 2012/0044849 A1 | 2/2012 | Farmanbar et al. | |
| 2012/0214496 A1* | 8/2012 | Joko | H04W 72/082 455/448 |
| 2012/0252515 A1 | 10/2012 | Tian et al. | |
| 2012/0269143 A1* | 10/2012 | Bertrand | H04W 72/1231 370/329 |
| 2013/0107780 A1* | 5/2013 | Choi | H04W 52/0209 370/311 |
| 2013/0244709 A1* | 9/2013 | Davydov et al. | 455/501 |
| 2013/0288696 A1* | 10/2013 | Nanri | H04W 72/082 455/452.1 |

OTHER PUBLICATIONS

Samsung, 'Consideration of low-capacity/highlatency backhaul for CoMP',R1-111103, 3GPP TSGRAN1#64 meeting, Taipei, Taiwan, Feb. 21-25, 2011.

R1-131027, 3GPP TSG RAN WG1 #72bis, Resource Coordination for Small Cells with Non-Ideal Backhaul, Apr. 15, 2013.

R1-131028,3GPP TSG RAN WG1 Meeting #72b, Evaluation results on small cell enhancement scenario 2a, Apr. 15, 2013.

R1-131977, 3GPP TSG RAN WG1 Meeting #73, Evaluation Results on Coordination for SCE Scenario 1, May 20, 2013.

R1-131978, 3GPP Tsg Ran WG1 Meeting #73, Evaluation results on coordination for SCE scenario 2a with non-ideal backhaul, May 20, 2013.

R1-135228, 3GPP TSG RAN WG1 Meeting #75, Evaluation results of coordinated scheduling for SCE scenario 1 with non-ideal backhaul, Nov. 11, 2013.

R1-135229, 3GPP TSG RAN WG1 Meeting #75, Evaluation results of coordinated scheduling for SCE scenario 2a with non-ideal backhaul, Nov. 11, 2013.

R1-135230, 3GPP TSG RAN WG1 Meeting #75, Evaluation results of coordinated scheduling for CoMP scenario 2 with non-ideal backhaul, Nov. 11, 2013.

R1-135231, 3GPP TSG RAN WG1 #75, Discussion on Signalling for Inter-eNB Operation, Nov. 11, 2013.

\* cited by examiner

METHOD AND APPARATUS FOR PERFORMING SCHEDULING IN WIRELESS COMMUNICATION SYSTEM

CROSS-REFERENCE TO RELATED APPLICATION(S)

This application claims the benefit under 35 U.S.C. §119 (a) of a Korean patent application filed on Nov. 23, 2012 in the Korean Intellectual Property Office and assigned Serial No. 10-2012-0134077, the entire disclosure of which is hereby incorporated by reference.

TECHNICAL FIELD

The present disclosure relates to a method and an apparatus for performing scheduling in a wireless communication system. More particularly, the present disclosure relates to a method and an apparatus for performing scheduling capable of decreasing intercell interference and improving cell throughput in a wireless communication system.

BACKGROUND

In order to improve performance of wireless communication, efficient use of a radio spectrum is needed. However, intercell interference in a network environment, in which a plurality of cells is densely collected, is a significant cause of restricting the improvement of the performance. Accordingly, research has been conducted recently on cooperative transmission technology between multi-cells in order to address the intercell interference issue. There is a Coordinated Multi-Point (CoMP) transmission and reception technology introduced in the $3^{rd}$ Generation Partnership Project (3 GPP) Long Term Evolution (LTE) Rel.11 standard as one of the cooperative transmission technologies between multi-cells.

In the CoMP technology, an intercell interference signal may be dynamically blanked, or an interference signal may be converted into a reception desired signal through intercell cooperation to be transmitted. Accordingly, when the CoMP technology is used, performance of a cell-edge is improved, and a cell coverage area is improved, so that spectrum efficiency may be improved.

In the meantime, in order to improve performance of the CoMP technology, much research has been recently conducted. However, in order to maximally utilize new Degrees Of Freedom (DOF) provided by the cooperation between multi-cells, a centralized scheduler, which is aware of an interference situation between CoMP cooperating cells, needs to be used.

A main role of the centralized scheduler is to select the best User Equipment (UE) for each cell and determine a spatial multiplexing ratio so that a sum of rates is maximal. In order to efficiently allocate wireless resources to UEs within a cluster formed of a plurality of cells (for example, a plurality of Transmission Points (TPs)) connected with the centralized scheduler or a plurality of Radio Remote Heads (RRHs) or macro cell enhanced Node B (eNB)s or small cell eNBs (hereinafter, referred to as "TPs"), the centralized scheduler needs to obtain Channel State Information (CSI) between all of the UEs within the cluster and the TPs. Accordingly, the centralized scheduler receives the CSI from the TPs through an interface, that is, a backhaul, for communication between the centralized scheduler and the TPs.

An Ethernet backhaul, an optical fiber backhaul, and the like, may be used as the backhaul. However transception of the CSI through the backhaul (more particularly, the Ethernet backhaul) may cause a delay. When the transception of the CSI is delayed, scheduling (i.e., allocating wireless resources and a Modulation and Coding Scheme (MCS) to UEs within a corresponding cluster) is performed based on the delayed CSI, which deteriorates performance of the CoMP. For example, a scheduling scheme using the typical centralized scheduler is considerably vulnerable to the backhaul delay, and scheduling cannot be performed based on accurate CSI in an ever-changing wireless environment.

Therefore, a need exists for a method and an apparatus for performing scheduling capable of decreasing intercell interference and improving cell throughput in a wireless communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for performing scheduling in a wireless communication system.

Another aspect of the present disclosure is to provide a method and an apparatus for performing scheduling capable of decreasing intercell interference and improving cell throughput in a wireless communication system.

Yet another aspect of the present disclosure is to provide a method and an apparatus for more accurately performing scheduling according to a corresponding wireless environment in a wireless communication system.

In accordance with an aspect of the present disclosure, a method for performing a scheduling operation by a centralized scheduler in a wireless communication system is provided. The method includes receiving Channel State Information (CSI) about a channel between each of a plurality of Transmission Points (TPs) and each of a plurality of User Equipments (UEs) performing communication with each of the plurality of TPs from each of the plurality of TPs, performing a first scheduling operation for allocating wireless resources to each of the plurality of TPs based on the CSI received from each of the plurality of TPs, and transmitting first scheduling information representing a result of the first scheduling operation to each of the plurality of TPs, wherein the first scheduling information contains transmission power information representing transmission power for each of the wireless resources allocated to each of the plurality of TPs, and is used to perform a second scheduling operation to select a UE to communicate with each of the plurality of TPs.

In accordance with another aspect of the present disclosure, a method for performing a scheduling operation by a TP in a wireless communication system is provided. The method includes transmitting CSI about a channel between the TP and a plurality of UEs to a centralized scheduler which controls the plurality of TPs, and receiving first scheduling information representing a result of a first scheduling operation from the centralized scheduler, and performing a second scheduling operation for selecting a UE to perform communication among the plurality of UEs based on the first scheduling information, wherein the first scheduling operation is performed to allocate wireless resources to each of the plurality of TPs based on the CSI received from each of the plurality of TPs by the centralized scheduler, and wherein the first scheduling information contains transmission power information representing transmission power for each of the wireless resources allocated to each of the plurality of TPs.

In accordance with another aspect of the present disclosure, a centralized scheduler in a wireless communication system is provided. The centralized scheduler includes a backhaul interface configured to receive CSI about a channel between each of a plurality of TPs and each of a plurality of UEs performing communication with each of the plurality of TPs from each of the plurality of TPs, and a controller configured to perform a first scheduling operation for allocating wireless resources to each of the plurality of TPs based on the CSI received from each of the plurality of TPs, and to control the backhaul interface so as to transmit first scheduling information representing a result of the first scheduling operation to each of the plurality of TPs, wherein the first scheduling information contains transmission power information representing transmission power for each of the wireless resources allocated to each of the plurality of TPs, and is used to perform a second scheduling operation to select a UE to communicate with each of the plurality of TPs.

In accordance with another aspect of the present disclosure, a TP in a wireless communication system is provided. The TP includes a backhaul interface configured to transmit CSI about a channel between the TP and a plurality of UEs to a centralized scheduler which controls the plurality of TPs, and to receive first scheduling information representing a result of a first scheduling operation from the centralized scheduler, and a controller configured to perform a second scheduling operation for selecting a UE to perform communication among the plurality of UEs based on the first scheduling information, wherein the first scheduling operation is performed to allocate wireless resources to each of the plurality of TPs based on the CSI received from each of the plurality of TPs by the centralized scheduler, and wherein the first scheduling information contains transmission power information representing transmission power for each of the wireless resources allocated to each of the plurality of TPs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
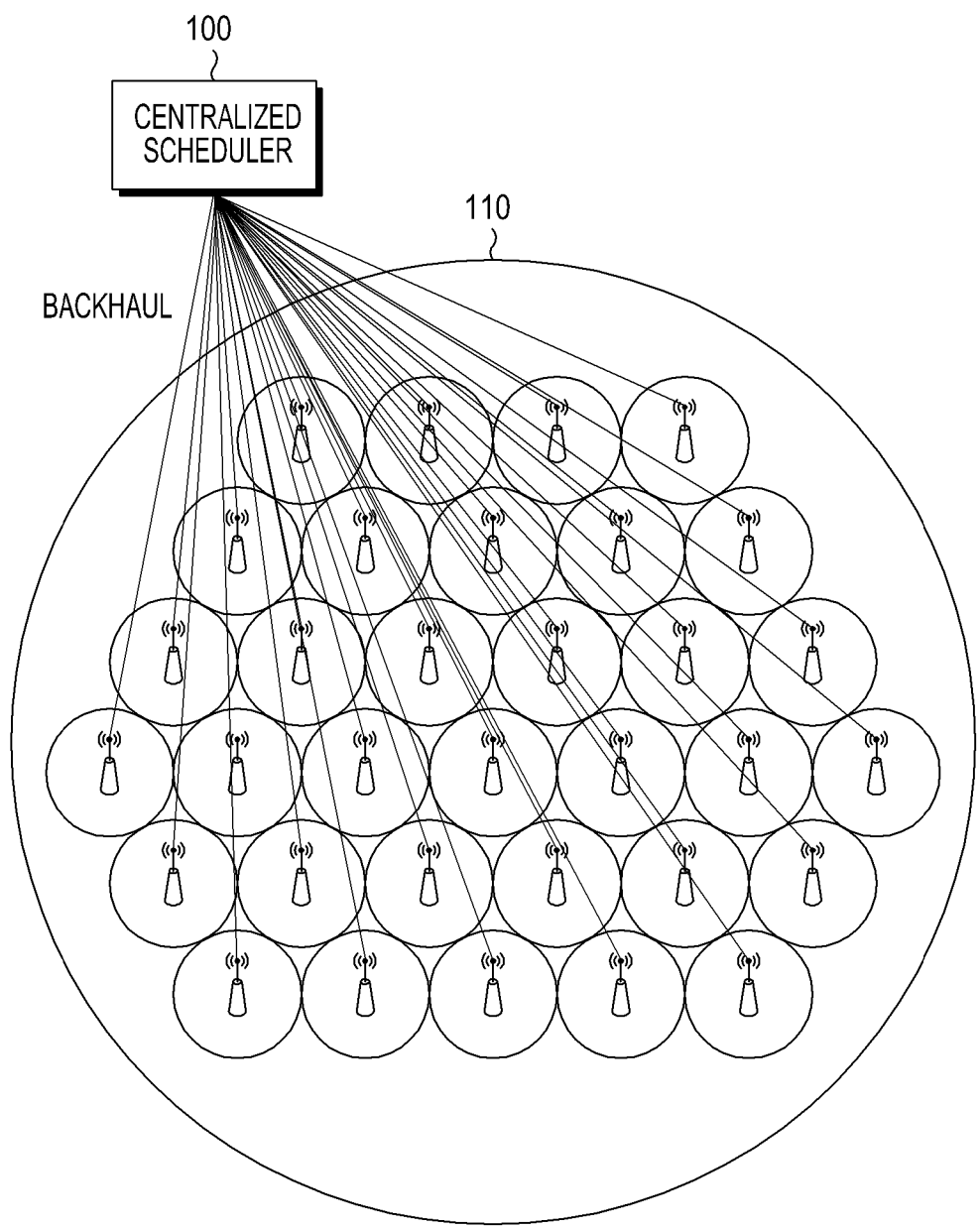
FIG. 1 illustrates a structure of a wireless communication system according to an embodiment of the present disclosure.

FIG. 1 illustrates a structure of a wireless communication system according to an embodiment of the present disclosure.

Referring to FIG. 1, the wireless communication system includes a centralized scheduler 100 and a plurality of cells included in a coordinated cluster 110. The plurality of cells may be, for example, a plurality of Transmission Points (TPs), a plurality of Radio Remote Heads (RRHs), a plurality of sub-cells, macro cell Enhanced Node B (eNB)s, small cell eNBs, or the like. The plurality of cells may have the same Physical Cell IDentifier (PCID) or different PCIDs. Hereinafter, for convenience of the description, the plurality of cells is referred to as a plurality of TPs.

The centralized scheduler 100 may perform communication by using each of the plurality of TPs, and an interface (for example, a backhaul). For example, the centralized scheduler 100 may receive Channel State Information (CSI) and the like, for a channel between a corresponding TP and a User Equipment (UE) from each of the plurality of TPs.

Figure 2:
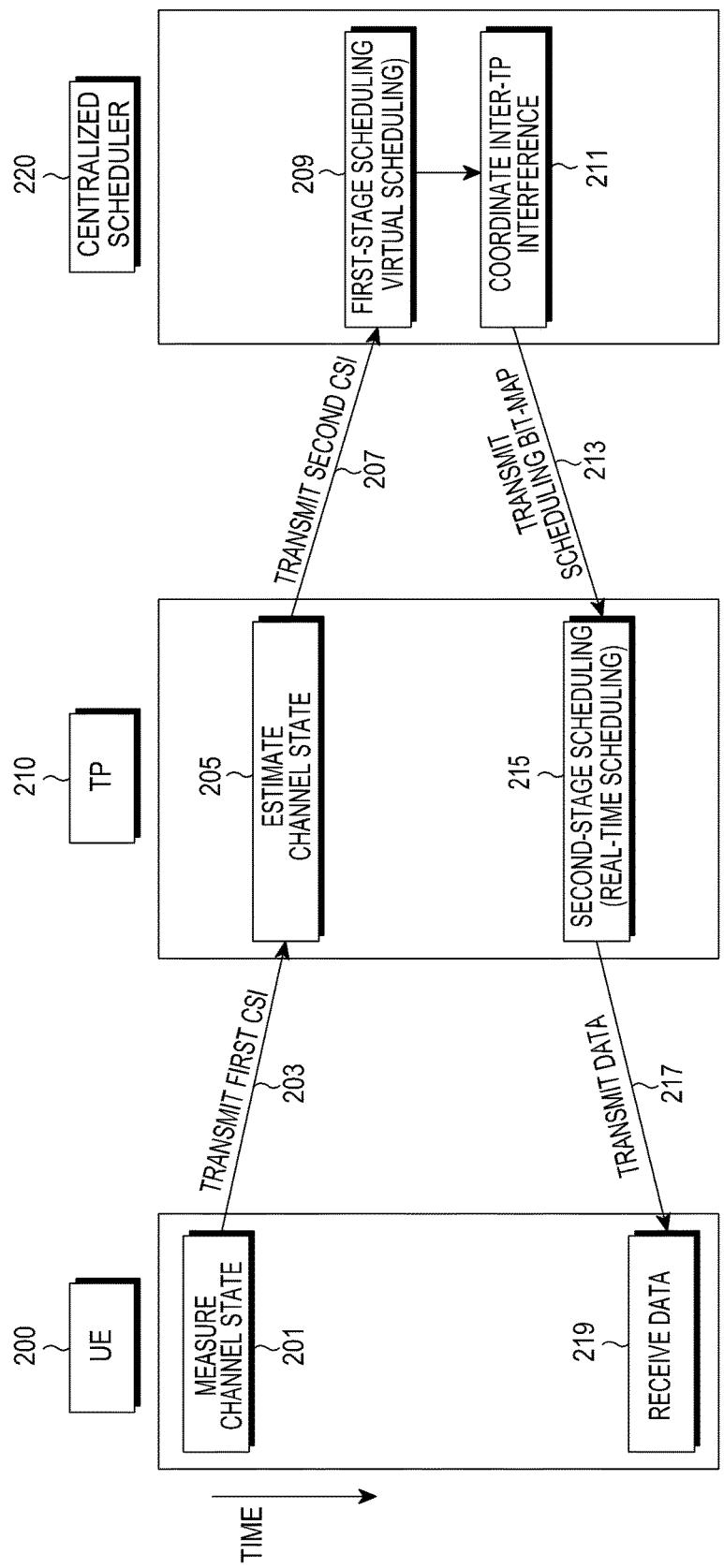
FIG. 2 illustrates a scheduling operation process in a wireless communication system according to an embodiment of the present disclosure.

FIG. 2 illustrates a scheduling operation process in a wireless communication system according to an embodiment of the present disclosure.

Referring to FIG. 2, the scheduling operation process is performed between a UE 200, a TP 210, and a centralized scheduler 220. The scheduling operation between the UE 200 and the TP 210 may be performed by each of a plurality of UEs and each of a plurality of TPs. Further, the centralized scheduler 220 may correspond to the centralized scheduler 100 illustrated in FIG. 1.

The UE 200 measures a channel state for a channel between the UE 200 and the TP 210 in operation 201, and transmits a first CSI containing information about the measured channel state to the TP 210 in operation 203. The first CSI may include a Channel-Quality Indicator (CQI), a Precoding Matrix Indicator (PMI), a Rank Indicator (RI), and the like.

The TP 210 estimates the channel state of the channel between the UE 200 and the TP 210 in operation 205, and transmits a second CSI containing information about the estimated channel state to the centralized scheduler 220 in operation 207. Here, the second CSI may include Reference Signal Received Power (RSRP), UpLink (UL) Sounding Reference Signal (SRS) power, and the like, based on a Cell-specific Reference Signal (CRS) or a Channel State Information Reference Signal (CSI-RS). Further, the second CSI may additionally contain the first CSI received from the UE 200.

The centralized scheduler 220 may receive the second CSI from the plurality of TPs including the TP 210. Here, second CSI of the plurality of TPs may also be generated by the same method as that of the second CSI of the TP 210. The centralized scheduler 220 performs first-stage scheduling (i.e., virtual scheduling: resource coordinated scheduling) based on the second CSI received from the plurality of TPs in operation 209. The first-stage scheduling may be performed for allocating wireless resources and transmission power for DownLink (DL) transmission to each TP, and for determining a scheduling candidate UE for each TP for interference control.

When the scheduling candidate UE is determined for each TP, the centralized scheduler 220 performs Inter-TP coordination on the corresponding scheduling candidate UE in operation 211. For example, the centralized scheduler 220 may perform an operation of detecting a TP acting as interference for the scheduling candidate UE for each TP, and controlling power during a time interval for the detected TP as the Inter-TP interference coordination operation.

The inter-TP interference coordination operation may include, for example, one of a power on/off control operation and a blank on/off control operation. Here, the power on/off control operation represents an operation of controlling power so as to prevent data (for example, data on a Physical Downlink Shared Channel (PDSCH)), a reference signal (i.e., a Cell-specific Reference signal (CRS) and a DeModulation Reference Signal (DM-RS)) from being transmitted in allocated wireless resources for the time interval. Further, the blank on/off control operation represents an operation of controlling power so that the data is not transmitted and the reference signal is transmitted in allocated wireless resources.

The centralized scheduler 220 transmits a scheduling bit-map to the TP 210 in operation 213. Further, the centralized scheduler 220 may generate the scheduling bit-map so as to contain power control information on each TP for a specific time interval, and transmit the generated scheduling bit-map.

The scheduling bit-map may include transmission power information about each wireless resource allocated to each TP. Otherwise, the scheduling bit-map may include whether power is on/off during the specific time interval in a form of a bit value (for example, when power is on, a value of "1" is included, and when power is off, a value of "0" is included), or include whether blank is on/off for the specific time interval in a form of a bit value (for example, when blank is on (a situation in which only the reference signal is transmittable), a value of "1" is included, and when blank is off (i.e., a situation in which both the data and the reference signal are transmittable), a value of "0" is included).

The TP 210 receives the scheduling bit-map, and performs second-stage scheduling (i.e., real-time scheduling: UE scheduling) based on the received scheduling bit-map in operation 215. The scheduling bit-map is information indicating that interference for the TP 210 is controlled (i.e., power of the interfering TP is controlled), so that the TP 210 may perform scheduling in real time considering the corresponding wireless environment in which interference is controlled.

In the meantime, the second-stage scheduling is for the purpose of overcoming a backhaul delay, and may be separately performed from the first-stage scheduling of operation 209 to determine the scheduling bit-map.

The second-stage scheduling is performed based on the scheduling bit-map containing the newest CSI information reported by the UEs receiving services from the corresponding TP, and the power on/off information (or blank on/off information) for the specific time interval of the interfering TPs received from the centralized scheduler 220. Accordingly, a Modulation and Coding Scheme (MCS) determination (i.e., a link adaptation operation) may also be performed again.

As described above, according to the performance of dual-stage scheduling in the centralized scheduler 220 and each TP, delay-tolerant scheduling (for example, scheduling robust to the backhaul delay) may be performed.

When the wireless resources and the MCS are allocated to the UE 200 according to the performance of the scheduling, the TP 210 transmits data to the UE 200 in operation 217. Thereafter, the UE 200 may receive the data and perform wireless communication in operation 219.

Hereinafter, the operations of the TP 210 and the centralized scheduler 220 will be described. First, the operation of the TP 210 will be described with reference to FIG. 3.

Figure 3:
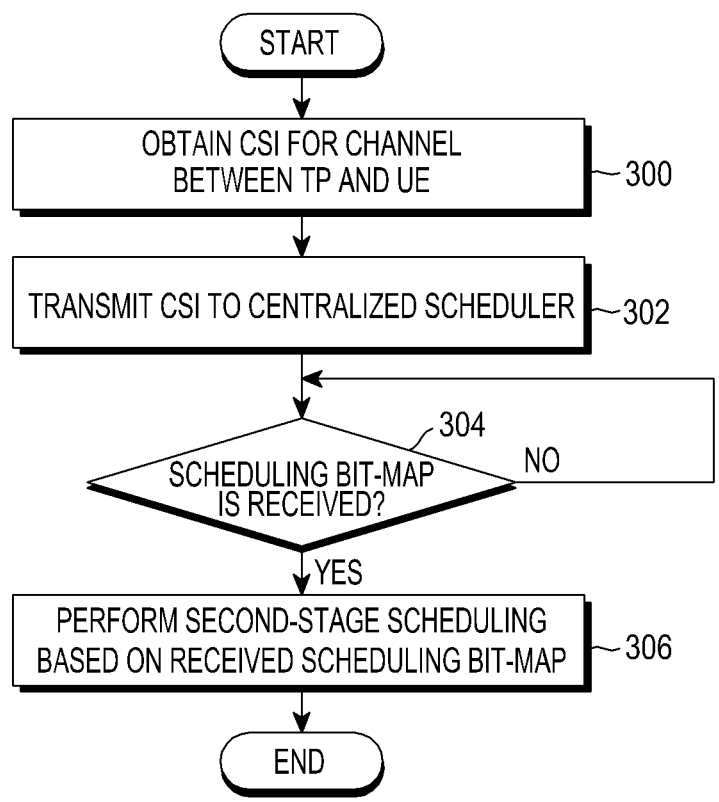
FIG. 3 is a flowchart illustrating a process of performing scheduling by a Transmission Point (TP) in a wireless communication system according to an embodiment of the present disclosure.

FIG. 3 is a flowchart illustrating a process of performing scheduling by a TP in a wireless communication system according to an embodiment of the present disclosure.

Referring to FIG. 3, the TP 210 obtains CSI for a channel between the TP 210 and the UE 200 in operation 300. The TP 210 may receive the CSI from the UE 200, or obtain the CSI by directly measuring a state of the channel between the TP 210 and the UE 200. Here, the TP 210 may use any one or all of the CSI received from the UE 200 and the directly measured CSI. In the meantime, the CSI obtainable by the TP 210 may include RSRP, UL SRS power, CQI, PMI, and RI measured based on the CRS or CSI-RS.

The TP 210 transmits the obtained CSI to the centralized scheduler 220 in operation 302. Thereafter, the TP 210 determines whether the scheduling bit-map is received from the centralized scheduler 220 in operation 304. The scheduling bit-map contains information representing whether power is on/off or blank is on/off for at least one of the plurality of TPs included in the specific cluster 110 in a form of a bit value. Further, the scheduling bit-map may be generated according to a time unit (for example, a Transmit Time Interval (TTI)), and for example, the scheduling bit-map may be generated as represented in Table 1 below.

TABLE 1

|  | First TP | Second TP | Third TP | Fourth TP | ... | $N^{th}$ TP |
|---|---|---|---|---|---|---|
| First TTI | 0 | 0 | 1 | 0 | ... | 1 |
| Second TTI | 0 | 1 | 0 | 0 | ... | 1 |

Table 1 represents the scheduling bit-map of the first TTI and the second TTI generated for the first TP among the plurality of TPs. As represented in Table 1, a position of each bit is one-to-one mapped to each TP, and 1 and 0 represent power on/off (or off/on) or blank on/off (or off/on) of the corresponding TP, respectively.

The TP, which is off for the first TTI and the second TTI, may be the interfering TP of the first TP. Further, the wireless environment may be continuously changed, so that the interfering TP may be changed for each TTI. In the meantime, the scheduling bit-map may contain on/off information about the entirety of the plurality of TPs, but may include on/off information about partial TPs among the plurality of TPs.

When the aforementioned scheduling bit-map is received, the TP 210 proceeds to operation 306 to perform second-stage scheduling based on the received scheduling bit-map. For example, the TP 210 performs the second-stage scheduling considering a wireless environment in which interference is controlled by the centralized scheduler 220.

In the embodiment of the present disclosure, each TP separately performs the second-stage scheduling from the first-stage scheduling to determine the scheduling bit-map and overcome the backhaul delay between the centralized scheduler 220 and each TP. The second-stage scheduling is performed based on the scheduling bit-map containing the newest CSI information reported by the UEs receiving services from the corresponding TP, and the power on/off information (or blank on/off information) for a specific time interval of the interfering TPs received from the centralized scheduler 220. Accordingly, the determination of the MCS may be performed again. As described above, in an embodiment of the present disclosure, delay-tolerant scheduling (for example, scheduling robust to the backhaul delay) may be performed according to the performance of the multi-stage scheduling in the centralized scheduler 220 and each TP. The operation of the centralized scheduler 220 will be described with reference to FIG. 4.

Figure 4:
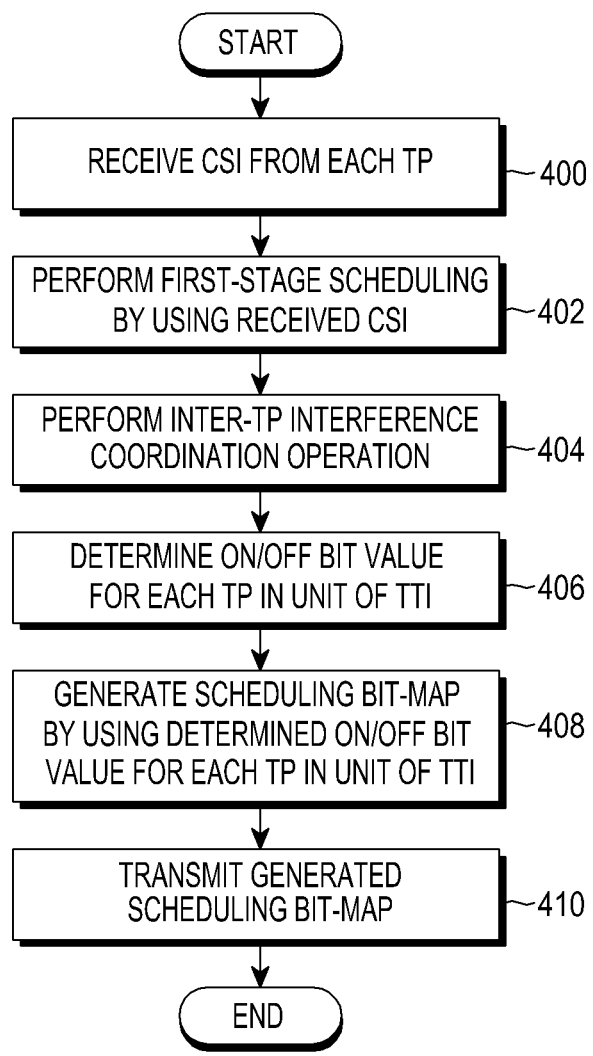
FIG. 4 is a flowchart illustrating a process of performing scheduling by a centralized scheduler in a wireless communication system according to an embodiment of the present disclosure.

FIG. 4 is a flowchart illustrating a process of performing scheduling by a centralized scheduler in a wireless communication system according to an embodiment of the present disclosure.

Referring to FIG. 4, the centralized scheduler 220 receives CSI for a channel between a corresponding TP and the UE from each of the plurality of TPs in operation 400.

Figure 5A:
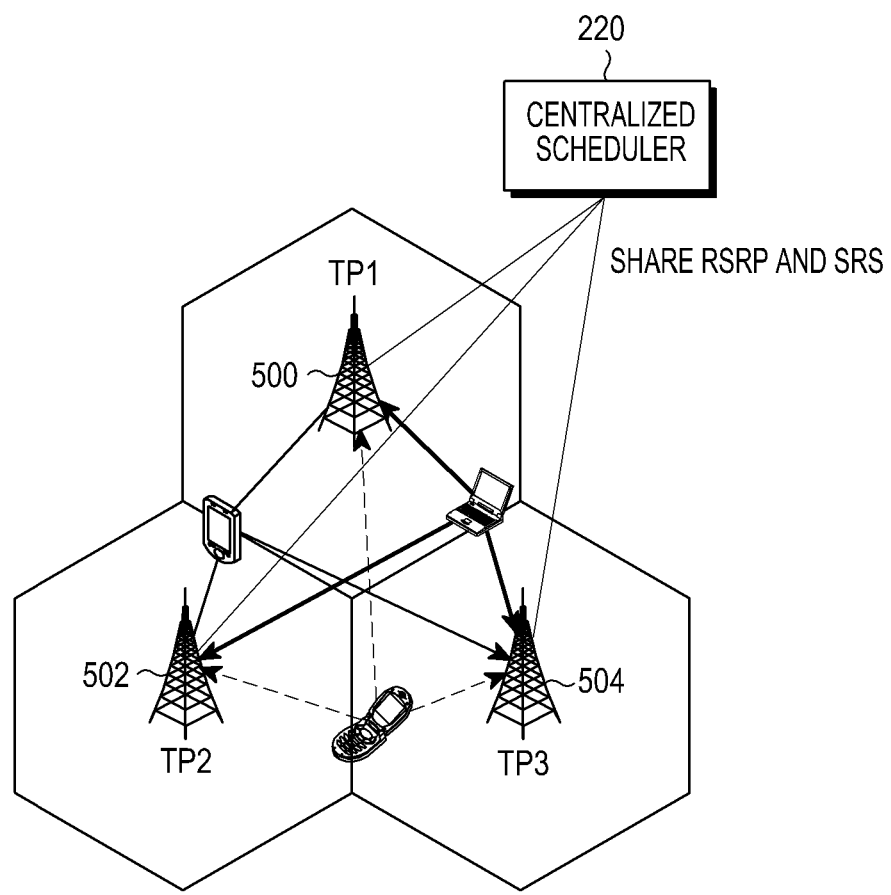
FIGS. 5A and 5B illustrate an operation of receiving Channel State Information (CSI) by a centralized scheduler in a wireless communication system according to an embodiment of the present disclosure.
Figure 5B:
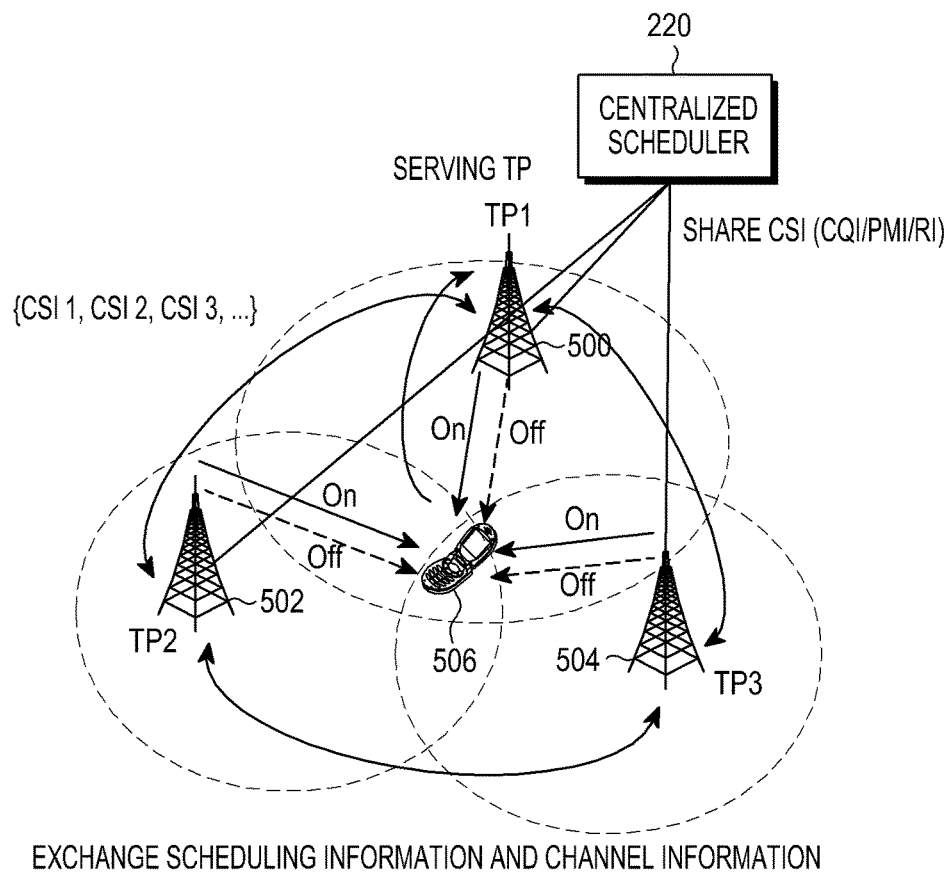

FIGS. 5A and 5B illustrate an operation of receiving CSI by a centralized scheduler in a wireless communication system according to an embodiment of the present disclosure.

Referring to FIG. 5A, the centralized scheduler 220 may receive information about a channel state measured by each of the plurality of TPs (i.e., a first TP 500, a second TP 502, and a third TP 504), that is, information about RSSP and UL SRS power, as the CSI.

Referring to FIG. 5B, the centralized scheduler 220 may receive CQI, PMI, and RI received from a UE 506 within a corresponding cell by each of the plurality of TPs (i.e., the first TP 500, the second TP 502, and the third TP 504) as the CSI. The centralized scheduler 220 may receive a plurality of elements of CSI when a multi-CSI feedback scheme is used. For example, the state of the channel between the UE 506 and the first TP 500 is changed according to whether the power of each of the first TP 500, the second TP 502, and the third TP 504 is controlled, so that the centralized scheduler 220 may receive the plurality of elements of CSI according to each situation.

More particularly, the state of the channel between the UE 506 and the first TP 500 is changed depending on each of a case where the power of all of the first TP 500, the second TP 502, and the third TP 504 is on, a case where the power of the first TP 500 and the second TP 502 is on, and the power of the third TP 504 is off, a case where the power of the first TP 500 and the third TP 504 is on and the power of the second TP 502 is off, a case where the power of the first TP 500 is on, and the power of the second TP 502 and the third TP 504 is off, and the CSI according to each of the four cases may be transmitted to the centralized scheduler 220.

Referring back to FIG. 4, when the CSI transmitted as described above is received, the centralized scheduler 220 performs first-stage scheduling by using the received CSI in operation 402. The first-stage scheduling is for the purpose of determining scheduling candidate UEs in advance for interference control, and an operation process will be described with reference to FIG. 6 below.

The centralized scheduler 220 performs an inter-TP interference coordination operation in operation 404. More particularly, the centralized scheduler 220 performs the inter-TP coordination on the scheduling candidate UEs of each of the entire TPs within the corresponding cluster. For example, the centralized scheduler 220 may perform the operation so as to determine control of power of the TP exerting an influence of interference on each of the UEs for each TTI. The inter-TP interference coordination operation will be described with reference to FIG. 8 below.

The centralized scheduler 220 determines a power on/off bit value (or a blank on/off bit value) for each TP in the unit of the TTI based on a result of the inter-TP interference coordination operation in operation 406. The power on/off bit value for each TP for each TTI may represent a different blank pattern.

The centralized scheduler 220 generates the scheduling bit-map in the unit of the TTI by using the determined power on/off bit value for each TP in operation 408. Further, the centralized scheduler 220 transmits the generated scheduling bit-map to all of the TPs within the corresponding cluster in operation 410. Here, the scheduling bit-map transmitted to each TP includes a power on/off bit value (or a blank on/off bit value) for each TTI for adjacent TPs, as well as the power on/off bit value for each TTI of the corresponding TP, so that each TP may identify an interference control situation.

In the meantime, the centralized scheduler 220 detects N TPs exerting a large influence of interference (i.e., transmitting an interference signal having a size equal to or larger than a threshold value) on the UE of the corresponding TP cell among all of the TPs within the corresponding cluster. The centralized scheduler 220 may detect the N TPs based on RSRP for the UE of the corresponding TP cell, and determine the detected N TPs as the adjacent TPs. Here, as a value of N is large, it is possible to more accurately control the interference exerted on the corresponding TP, thereby improving scheduling performance, but complexity for the operation and the configuration of the centralized scheduler 220 may be increased.

The scheduling bit-map may be generated each time for each TTI to be used, but the scheduling bit-map to be used at a corresponding TTI may be induced and used considering the backhaul delay. In this case, the centralized scheduler 220 analyzes the development of the change in a blank pattern based on the scheduling bit-map for a TTI section (for example, a section from the first TTI to the $N^{th}$ TTI) and induces the blank pattern for the corresponding TTI based on the analysis result, thereby generating the scheduling bit-map. For example, the centralized scheduler 220 may generate the scheduling bit-map based on an Infinite Impulse Response (IIR) filtered blank pattern for use. Otherwise, the centralized scheduler 220 may randomly select one blank pattern among the plurality of blank patterns stored in a buffer, and generate the scheduling bit-map based on the selected blank pattern for use.

All of the TPs within the corresponding cluster receiving the scheduling bit-map generated by the aforementioned method may perform the second-stage scheduling based on the received scheduling bit-maps, respectively. In this case, the UEs selected according to the result of the second-stage scheduling may be different from the UEs selected according to the result of the first-stage scheduling. The first-stage scheduling will be described with reference to FIG. 6.

Figure 6:
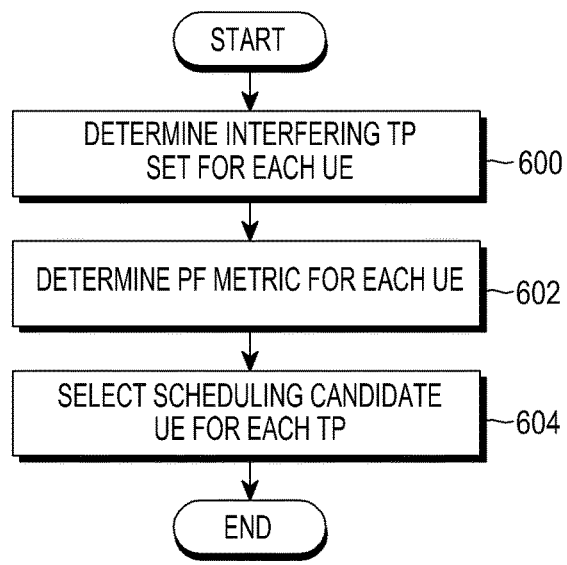
FIG. 6 is a flowchart illustrating a process of performing first-stage scheduling by a centralized scheduler according to an embodiment of the present disclosure.

FIG. 6 is a flowchart illustrating a process of performing first-stage scheduling by a centralized scheduler according to an embodiment of the present disclosure.

Referring to FIG. 6, the centralized scheduler 220 determines an interfering TP set for each UE in operation 600. The interfering TP set represents a set of TPs in which power control is demanded for interference control for each UE. A method of determining the interfering TP set will be described with reference to FIG. 7 below.

The centralized scheduler 220 determines a PF metric for each UE in operation 602. The PF metric is a value representing a quantity of data processed of each UE, and may be determined by, for example, a ratio of a quantity of data processed of each UE for an $i^{th}$ TTI to an average quantity of data processed of each UE for a TTI section. Here, the quantity of data processed of each UE for the $i^{th}$ TTI may be determined by using a Signal-to-Interference plus Noise Ratio (SINR) for each UE. Further, the PF metric may be determined by further considering a Quality of Service (QoS) of each UE, a resource allocation ratio, and the like, and the SINR and the PF metric may be determined based on an assumption that power of the interfering TPs is off.

The centralized scheduler 220 selects a scheduling candidate UE for each TP based on the PF metric in operation 604. In this case, the centralized scheduler 220 may select a UE having a maximum PF metric as the scheduling candidate UE.

Hereinafter, an operation of the centralized scheduler 220 in operation 600 will be described with reference to FIG. 7.

Figure 7:
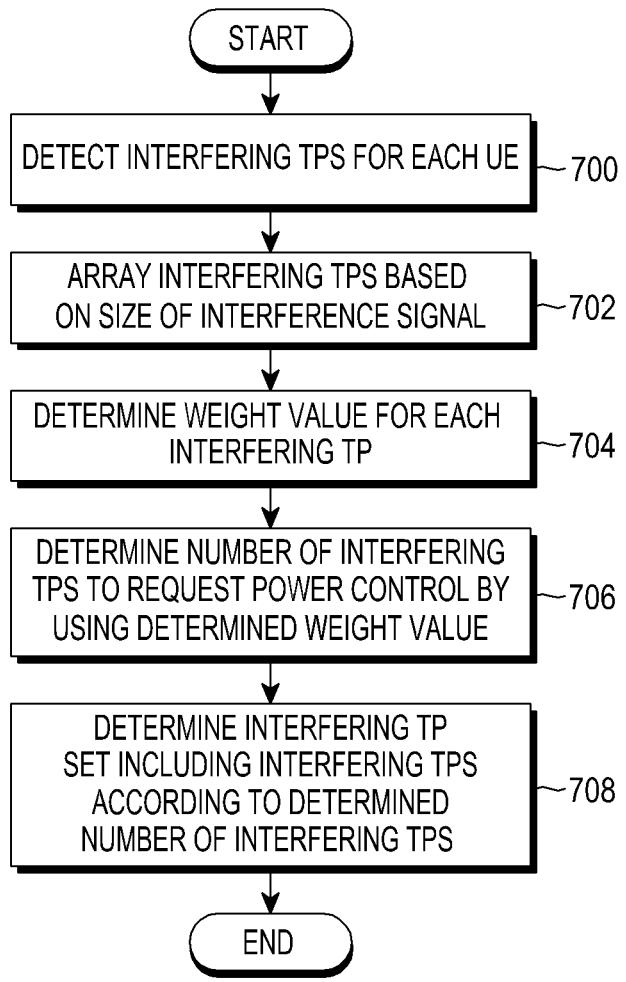
FIG. 7 is a flowchart illustrating a process of determining an interfering TP set for each of a plurality of User Equipments (UEs) by a centralized scheduler according to an embodiment of the present disclosure.

FIG. 7 is a flowchart illustrating a process of determining an interfering TP set for each UE by a centralized scheduler according to an embodiment of the present disclosure.

Referring to FIG. 7, the centralized scheduler 220 detects interfering TPs of each UE in operation 700. Each UE may have one or more interfering TPs generating inter-cell interference, and the interfering TPs are not limited to one macro Base Station (BS), but may be detected considering all of the TPs within a corresponding cluster.

The centralized scheduler 220 arranges the detected interfering TPs based on a size of the interference signal in operation 702. For example, the centralized scheduler 220 arranges the detected interfering TPs in an order of a size of the interference signal from largest to smallest.

Thereafter, the centralized scheduler 220 determines a weight value for each interfering TP in operation 704. The weight value represents a compensation weight value to be used to determine the number of interfering TPs, and may be determined as represented in Equation 1 below.

Macro to Macro Compensation Weight=$\alpha$

Macro to Low-power-TP Compensation Weight=$\beta$

Low-power-TP to Macro Compensation Weight=$\gamma$

Low-power-TP to Low-power-TP Compensation Weight=$\lambda$     Equation 1

In Equation 1, $\alpha$ represents a weight value determined in a case where a serving TP of UE i is a macro BS and a TP demanding power control is another macro BS, $\beta$ represents a weight value determined in a case where the serving TP of the UE i is the macro BS, and the TP demanding power control is a low-power TP, $\gamma$ represents a weight value determined in a case where the serving TP of the UE i is the low-power TP, and the TP demanding power control is the macro BS, and $\lambda$ represents a weight value determined in a case where the serving TP of the UE i is the low-power TP, and the TP demanding power control is another low-power TP. The centralized scheduler 220 may efficiently control inter-cell interference within a corresponding cluster by adjusting the weight values $\alpha$, $\beta$, $\gamma$, and $\lambda$.

The centralized scheduler 220 determines the number of interfering TPs to request the power control by using the determined weight value in operation 706. Here, the number of interfering TPs to request the power control may be determined by Equation 2 below.

$$k^* = \arg\max_{k \in \{0,1,\ldots,INT_i\}} \frac{R_i(k)}{W_k}$$     Equation 2

In Equation 2, k* represents the number of interfering TPs to request the power control, $INT_i$ represents the number of interfering TPs of the UE i, $R_i(k)$ represents a rate when the number of interfering TPs to request the power control is k, and $W_k$ represents a compensation weight factor according to the number of interfering TPs to request the power control, which may be determined by using Equation 3 below.

$$W_{k+1}=W_k+\delta, W_0=1 \quad \text{Equation 3}$$

In Equation 3, δ may be one value between the aforementioned weight values α, β, γ, and λ. More particularly, δ may be α when the serving TP of the UE i is the macro BS and the TP demanding the power control is another macro BS, δ may be β when the serving TP of the UE i is the macro BS and the TP demanding the power control is the low-power TP, δ may be γ when the serving TP of the UE i is the low-power TP and the TP demanding the power control is the macro BS, and δ may be λ when the serving TP of the UE i is the low-power TP and the TP demanding the power control is another low-power TP.

The centralized scheduler 220 determines an interference TP set including the interfering TPs according to the determined number of interfering TPs in operation 708. In this case, the centralized scheduler 220 may determine as many interfering TPs as the determined number of TPs as the interfering TP set in the order of a size of the interference signal from largest to smallest.

A process of performing an inter-TP interference coordination operation by the centralized scheduler 220 will be described with reference to FIG. 8.

Figure 8:
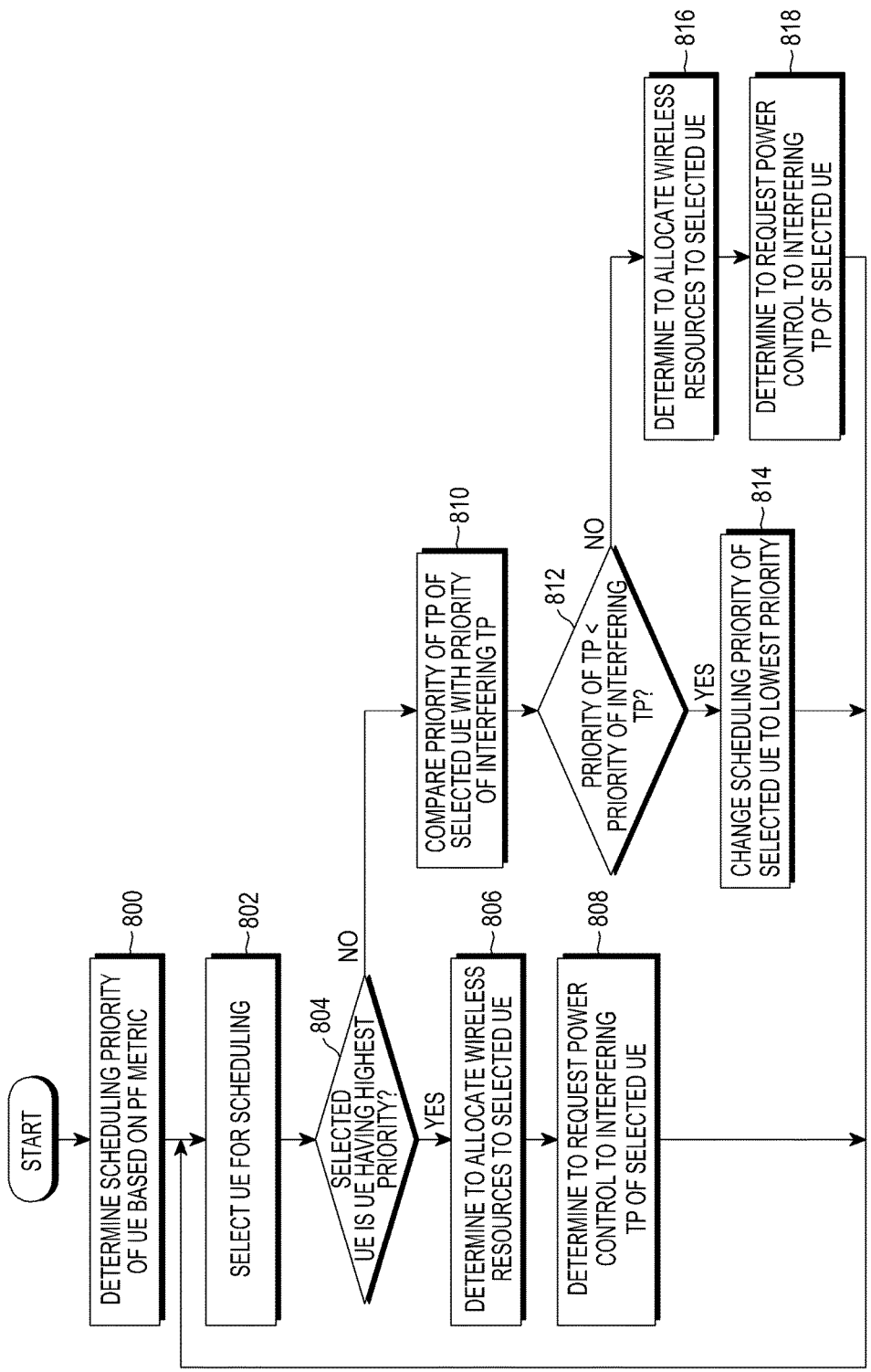
FIG. 8 is a flowchart illustrating a process of performing an inter-TP interference coordination operation between TPs by a centralized scheduler according to an embodiment of the present disclosure.

FIG. 8 is a flowchart illustrating a process of performing an inter-TP interference coordination operation between TPs by a centralized scheduler according to an embodiment of the present disclosure.

Referring to FIG. 8, the centralized scheduler 220 determines a scheduling priority of the UE based on the PF metric in operation 800. More particularly, the centralized scheduler 220 arranges the corresponding UEs based on the PF metrics of the respective UEs determined as the scheduling candidates. For example, as represented in Table 2 below, in a case where information about the UE for each TP, the PF metric, and the interfering TP is stored in a table type, the centralized scheduler 220 arranges the corresponding UEs in an order of a PF metric size from largest to smallest as represented in Table 3 below. As the PF metric is large, the scheduling priority of the UE becomes larger.

TABLE 2

| TP | UE | PF metric | Interfering TP |
|----|----|-----------|----------------|
| 1  | A  | 7         | 4              |
| 2  | B  | 16        | 1, 5           |
| 3  | C  | 10        | 2              |
| 4  | D  | 4         | 1              |
| 5  | E  | 3         | 3, 1           |

TABLE 3

| Priority | TP | UE | PF metric | Interfering TP |
|----------|----|----|-----------|----------------|
| 1        | 2  | B  | 16        | 1, 5           |
| 2        | 3  | C  | 10        | 2              |
| 3        | 1  | A  | 7         | 4              |
| 4        | 4  | D  | 4         | 1              |
| 5        | 5  | E  | 3         | 3, 1           |

The centralized scheduler 220 selects the UE for scheduling in operation 802. For example, the centralized scheduler 220 may select the UE having the highest priority (i.e., UE B having the largest PF metric). Thereafter, the centralized scheduler 220 determines whether the selected UE is a UE having the highest priority in operation 804.

When the selected UE is the UE having the highest priority, the centralized scheduler 220 proceeds to operation 806 to determine to allocate wireless resources to the selected UE. Further, the centralized scheduler 220 determines to request power control to the interfering TPs corresponding to the selected UE in operation 808. For example, the interfering TPs for the UE B having the highest priority are a TP 1 and a TP 5 in Table 2, so that the centralized scheduler 220 may determine to request the power control to the TP 1 and the TP 5 for the Nth TTI for which the UE B receives the wireless resources and performs communication.

TABLE 4

| Priority | TP     | UE | PF metric | Interfering TP |
|----------|--------|----|-----------|----------------|
| 1        | 2      | B  | 16        | 1, 5           |
| 2        | 3      | C  | 10        | 2              |
| —        | 1 (off)| A  | 7         | 4              |
| 3        | 4      | D  | 4         | 1              |
| —        | 5 (off)| E  | 3         | 3, 1           |

Table 4 represents that power of the TP 1 and the TP 5, which are the interfering TPs of the UE B, is controlled in a form in which the power is off during the $N^{th}$ TTI. According to the power-off of the TP 1 and the TP 5, the scheduling priority corresponding to the $N^{th}$ TTI may be changed as represented in Table 4.

In the meantime, when the scheduling for the UE having the highest priority is completed, the centralized scheduler 220 proceeds to operation 802 again to select a UE for the scheduling. In this case, the centralized scheduler 220 may select the UE having the highest priority among the remaining UEs except for the UE having the highest priority on which the scheduling is completed. In Table 4, UE C having the second priority may be selected next to the UE B.

The centralized scheduler 220 determines whether the selected UE is the UE having the highest priority in operation 804. If it is determined in operation 804 that the UE C is not the UE having the highest priority but is the UE having the second priority, the centralized scheduler 220 proceeds to operation 810.

The centralized scheduler 220 compares a priority of the TP of the selected UE and a priority of the interfering TP of the selected UE in operation 810. When the priority of the TP of the selected UE is lower than the priority of the interfering TP of the selected UE in operation 812, the centralized scheduler 220 proceeds to operation 814 to change the scheduling priority of the selected UE to the lowest priority. Table 5 below represents that the scheduling priority of the UE C is changed to the lowest priority.

TABLE 5

| Priority | TP     | UE | PF metric | Interfering TP |
|----------|--------|----|-----------|----------------|
| 1        | 2      | B  | 16        | 1, 5           |
| —        | 1 (off)| A  | 7         | 4              |
| 2        | 4      | D  | 4         | 1              |
| —        | 5 (off)| E  | 3         | 3, 1           |
| 3        | 3      | C  | 10        | 2              |

In the meantime, when it is determined in operation 812 that the priority of the TP of the selected UE is not lower than the priority of the interfering TP of the selected UE, the centralized scheduler 220 proceeds to operation 816 to determine to allocate the wireless resources to the selected UE. Further, the centralized scheduler 220 determines to request the power control to the interfering TPs of the selected UE in operation 818.

When the aforementioned process is completed, the centralized scheduler 220 generates a scheduling bit-map and transmits the generated scheduling bit-map to each TP.

Figure 9:
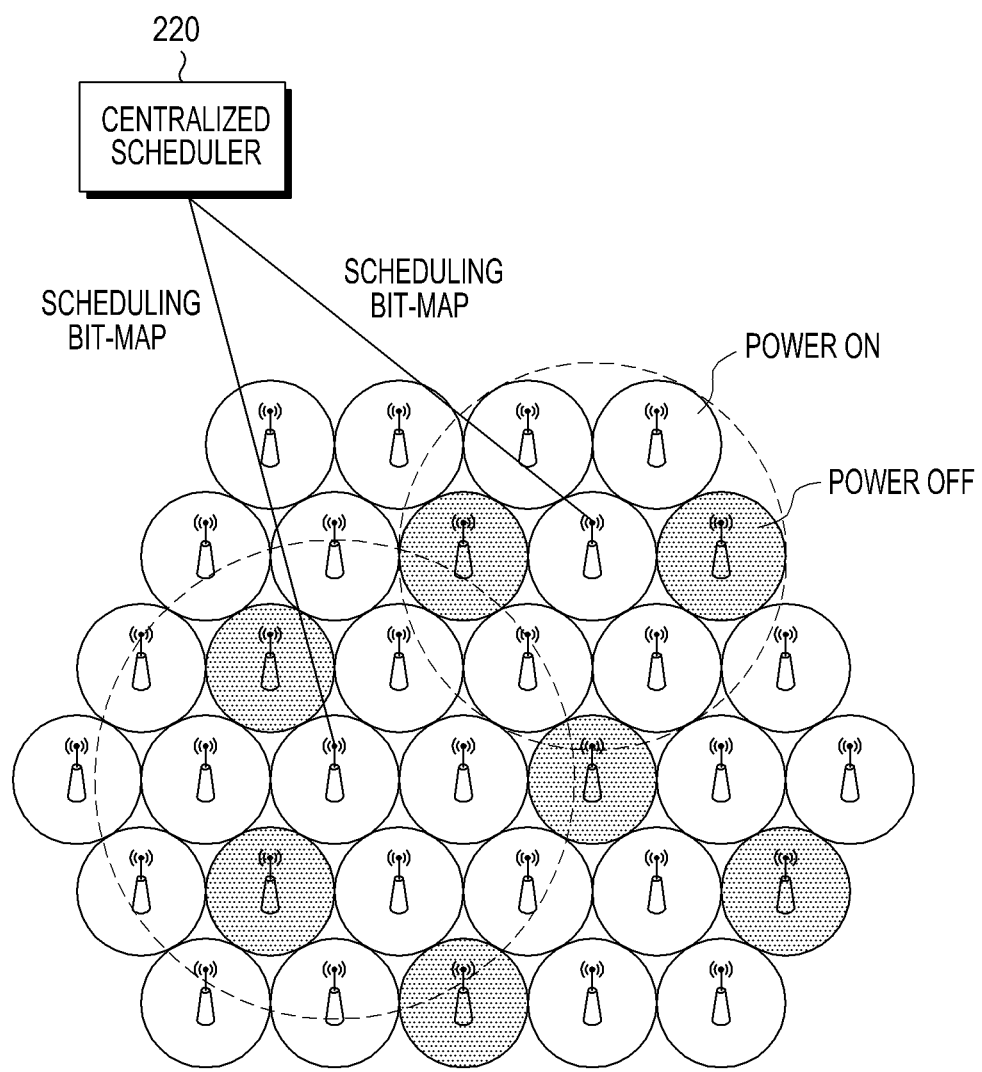
FIG. 9 illustrates an operation of transmitting a scheduling bitmap by a centralized scheduler according to an embodiment of the present disclosure.

FIG. 9 illustrates an operation of transmitting a scheduling bitmap by a centralized scheduler according to an embodiment of the present disclosure.

Referring to FIG. 9, it can be seen that the centralized scheduler 220 generates the scheduling bit-map for each cluster and transmits the generated scheduling bit-map. Shaded cells in FIG. 9 represent cells corresponding to the power-off (or blank-on) TP, and non-shaded cells represent cells corresponding to the power-on (or blank-off) TP. The power-off (or blank-off) TP and the power-on (or blank-off) TP may be changed for each TTI.

Figure 10:
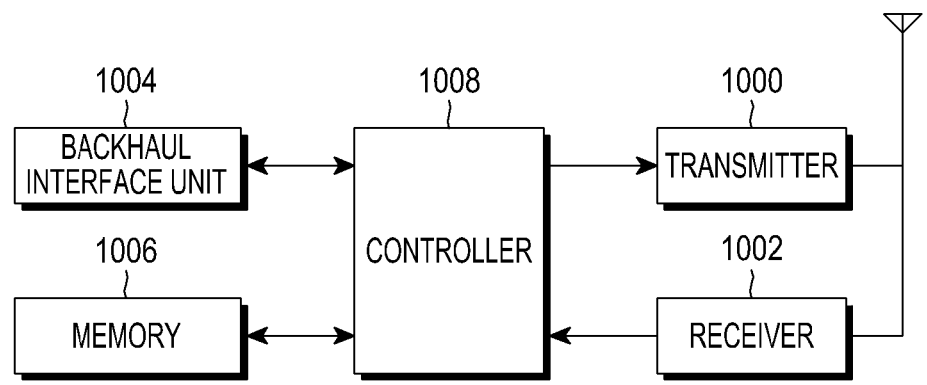
FIG. 10 is an internal diagram of a TP according to an embodiment of the present disclosure.

FIG. 10 is an internal diagram of a TP according to an embodiment of the present disclosure.

Referring to FIG. 10, the TP includes a transmitter 1000, a receiver 1002, a backhaul interface unit 1004, a memory 1006, and a controller 1008.

The transmitter 1000 and the receiver 1002 are elements for performing communication with the UE. For example, the transmitter 1000 transmits a reference signal, such as the CRS or the CSI-RS, and downlink data to the UE. Further, the receiver 1002 receives UL data, or the first CSI, such as the CQI, the PMI, and the RI transmitted from the UE.

The backhaul interface unit 1004 provides an interface for performing communication with the centralized scheduler 220. The backhaul interface unit 1004 transmits at least one of the first CSI obtained from the UE and the second CSI measured by the TP to the centralized scheduler 220.

The memory 1006 stores a plurality of elements of information used for the control of the operation of the TP, the information generated by the operation of the TP, and the like. The memory 1006 stores the first CSI and the second CSI, or the scheduling bit-map received from the centralized scheduler 220.

The controller 1008 controls the transmitter 1000, the receiver 1002, the backhaul interface unit 1004, and the memory 1006, and controls the general operation of the TP.

The controller 1008 receives the first CSI from the UE, or obtains the second CSI by directly measuring a state of the channel between the TP and the UE. The controller 1008 may obtain the RSRP, the UL SRS power, the CQI, the PMI, the RI, and the like, measured based on the CRS or the CSI-RS based on at least one of the first CSI and the second CSI.

The controller 1008 controls the backhaul interface unit 1004 so as to transmit at least one of the first CSI and the second CSI to the centralized scheduler 220. Further, when the scheduling bit-map for each TTI is received from the centralized scheduler 220, the controller 1008 performs second-stage scheduling based on the received scheduling bit-map.

Figure 11:
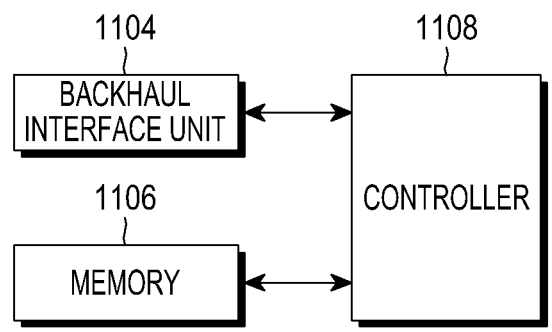
FIG. 11 is an internal diagram of a centralized scheduler according to an embodiment of the present disclosure.

FIG. 11 is an internal diagram of a centralized scheduler according to an embodiment of the present disclosure.

Referring to FIG. 11, the centralized scheduler 220 includes a backhaul interface 1104, a memory 1106, and a controller 1108.

The backhaul interface unit 1104 provides an interface for performing communication with each of a plurality of TPs included in a corresponding cluster. For example, the backhaul interface unit 1104 receives the second CSI from each of the plurality of TPs, and transmits the scheduling bit-map for each TTI to each of the plurality of TPs.

The memory 1106 stores a plurality of elements of information used for the control of the operation of the centralized scheduler 220, the information generated according to the operation of the centralized scheduler 220, and the like. Further, the memory 1106 stores the second CSI received from each of the plurality of TPs, the scheduling bit-map for each TTI, and the like.

The controller 1108 controls the backhaul interface unit 1104 and the memory 1106, and controls the general operation of the centralized scheduler 220. More particularly, the controller 1108 performs an operation below by controlling the backhaul interface unit 1104 and the memory 1106 so that the aforementioned operation of the centralized scheduler 220 is performed.

When the second CSI for a channel between a corresponding TP and UE is received from each of the plurality of TPs, the controller 1108 performs the first-stage scheduling by using the received second CSI. Thereafter, the controller 1108 performs the inter-TP interference coordination operation, and determines a power or blank on/off bit value for each TP in the unit of the TTI based on a result of the inter-TP interference coordination operation. Further, the controller 1108 generates a scheduling bit-map by using the determined power or blank on/off bit value for each TP in the unit of the TTI, and transmits the generated scheduling bit-map to each TP.

The present disclosure has an advantage in that inter-cell interference may be reduced and cell capacity and the amount of cell processed may be improved in a wireless communication system. Further, the present disclosure allows more accurate scheduling according to a corresponding wireless environment even in a wireless communication system in which a backhaul delay is generated.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a scheduling operation by a centralized scheduler in a wireless communication system, the method comprising:

receiving, at the centralized scheduler, channel state information (CSI) related to a channel between each of a plurality of transmission points (TPs) and each of a plurality of user equipments (UEs) performing communication with each of the plurality of TPs from each of the plurality of TPs;

performing, at the centralized scheduler, a first scheduling operation for allocating wireless resources to each of the plurality of TPs based on the received CSI and at least one interfering TP which transmits an interference signal to at least one UE to perform a scheduling operation among the plurality of UEs; and transmitting, by the centralized scheduler, first scheduling information indicating transmission power information on each of the plurality of TPs to each of the plurality of TPs, wherein the first scheduling information is used to control a transmission power for the at least one interfering TP, and is used to perform a second scheduling operation to select a UE to communicate with each of the plurality of TPs, and wherein the first scheduling information is generated based on an infinite impulse response (IIR) filtered blank pattern, the IIR filtered blank pattern being selected as a result of analysis of a development of a change in a blank pattern based on a scheduling bitmap for a transmit time interval (TTI) section.

2. The method of claim 1, wherein the CSI comprises at least one of a rank indicator (RI), a precoding matrix indicator (PMI), a channel quality indicator (CQI), and information related to a reference signal received power (RSRP).

3. The method of claim 1, wherein the first scheduling information is used to perform a link adaptation operation to determine a modulation and coding scheme (MCS) by each of the plurality of TPs.

4. The method of claim 1, wherein the at least one UE is determined based on a proportional fair (PF) metric related to each of the plurality of UEs.

5. The method of claim 1,
wherein the transmission power information on each of the plurality of TPs indicates whether a first transmission power for each of the plurality of TPs is provided, or whether the first transmission power or a second transmission power for each of the plurality of TPs is provided, and
wherein the first transmission power is used for transmitting data and a reference signal, and the second transmission power is used for transmitting the reference signal.

6. A method for performing a scheduling operation by a transmission point (TP) in a wireless communication system, the method comprising:
transmitting, by the IP, channel state information (CSI) related to a channel between the TP and each of a plurality of user equipments (UEs) to a centralized scheduler which controls a plurality of TPs;
receiving, at the TP, first scheduling information indicating transmission power information on each of the plurality of TPs from the centralized scheduler;
and performing a second scheduling operation for selecting a UE to perform communication among the plurality of UEs based on the first scheduling information; wherein the first scheduling operation is performed to allocate wireless resources to each of the plurality of TPs based on the CSI and at least one interfering TP by the centralized scheduler,
wherein the first scheduling information is used to control a transmission power for the at least one interfering TP, and
wherein the first scheduling information is generated based on an infinite impulse response (IIR) filtered blank pattern, the IIR filtered blank pattern being selected as a result of analysis of a development of a change in a blank pattern based on a scheduling bitmap for a transmit time interval (TTI) section.

7. The method of claim 6, wherein the CSI comprises at least one of a rank indicator (RI), a precoding matrix indicator (PMI), a channel quality indicator (CQI), and information related to a reference signal received power (RSRP).

8. The method of claim 6, further comprising:
performing a link adaptation operation to determine a modulation and coding scheme (MCS) based on the first scheduling information.

9. The method of claim 6, wherein the at least one UE is determined based on a proportional fair (PF) metric related to each of the plurality of UEs.

10. The method of claim 6,
wherein the transmission power information on each of the plurality of TPs indicates whether a first transmission power for each of the plurality of TPs is provided, or whether the first transmission power or a second transmission power for each of the plurality of TPs is provided, and
wherein the first transmission power is used for transmitting data and a reference signal, and the second transmission power is used for transmitting the reference signal.

11. A centralized scheduler in a wireless communication system, the centralized scheduler comprising:
a backhaul interface configured to receive channel state information (CSI) related to a channel between each of a plurality of transmission points (TPs) and each of a plurality of user equipments (UEs) performing communication with each of the plurality of TPs from each of the plurality of TPs; and
at least one processor configured to:
perform a first scheduling operation for allocating wireless resources to each of the plurality of TPs based on the received CSI and at least one interfering TP which transmits an interference signal to at least one UE to perform a scheduling operation among the plurality of UEs, and
control the backhaul interface so as to transmit first scheduling information indicating transmission power information on each of the plurality of TPs to each of the plurality of TPs,
wherein the first scheduling information is used to control a transmission power for the at least one interfering TP, and is used to perform a second scheduling operation to select a UE to communicate with each of the plurality of TPs, and
wherein the first scheduling information is generated based on an infinite impulse response (IIR) filtered blank pattern, the IIR filtered blank pattern being selected as a result of analysis of a development of a change in a blank pattern based on a scheduling bitmap for a transmit time interval (TTI) section.

12. The centralized scheduler of claim 11, wherein the CSI comprises at least one of a rank indicator (RI), a precoding matrix indicator (PMI), a channel quality indicator (CQI), and information related to a reference signal received power (RSRP).

13. The centralized scheduler of claim 11, wherein the first scheduling information is used to perform a link adaptation operation to determine a modulation and coding scheme (MCS) by each of the plurality of TPs.

14. The centralized scheduler of claim 11, wherein the at least one UE is determined based on a proportional fair (PF) metric related to each of the plurality of UEs.

15. The centralized scheduler of claim 11,
wherein the transmission power information on each of the plurality of TPs indicates whether a first transmission power for each of the plurality of TPs is provided, or whether the first transmission power or a second transmission power for each of the plurality of TPs is provided, and
wherein the first transmission power is used for transmitting data and a reference signal, and the second transmission power is used for transmitting the reference signal.

16. A transmission point (TP) in a wireless communication system, the TP comprising: a backhaul interface configured to:

transmit channel state information (CSI) related to a channel between the TP and each of a plurality of user equipments (UEs) to a centralized scheduler which controls a plurality of TPs, and receive first scheduling information representing transmission power information on each of the plurality of TPs in a unit of a time Interval from the centralized scheduler; and at least one processor configured to perform a second scheduling operation for selecting a UE to perform communication among the plurality of UEs based on the first scheduling information, wherein the first scheduling operation is performed to allocate wireless resources to each of the plurality of TPs based on the CSI and at least one interfering TP by the centralized scheduler, wherein the first scheduling information is used to control a transmission power for the at least one interfering TP, and wherein the first scheduling information is generated based on an infinite impulse response (IIR) filtered blank pattern, the IIR filtered blank pattern being selected as a result of analysis of a development of a change in a blank pattern based on a scheduling bitmap for a transmit time interval (TTI) section.

17. The TP of claim 16, wherein the CSI comprises at least one of a rank indicator (RI), a precoding matrix indicator (PMI), a channel quality indicator (CQI), and information related to a reference signal received power (RSRP).

18. The TP of claim 16, wherein the at least one processor is further configured to perform a link adaptation operation for determining a modulation and coding scheme (MCS) based on the first scheduling information.

19. The TP of claim 16, wherein the at least one UE is determined based on a proportional fair (PF) metric related to each of the plurality of UEs.

20. The TP of claim 16, wherein the transmission power information on each of the plurality of TPs indicates whether first transmission power for each of the plurality of TPs is provided, or whether the first transmission power or second transmission power for each of the plurality of TPs is provided, and wherein the first transmission power is used for transmitting data and a reference signal, and the second transmission power is used for transmitting the reference signal.

* * * * *